(12) United States Patent
Azam et al.

(10) Patent No.: US 11,715,404 B2
(45) Date of Patent: Aug. 1, 2023

(54) COLOR MODIFICATION BASED ON PERCEPTION TOLERANCE

(71) Applicant: Hewlett-Packard Development Company, L.P., Spring, TX (US)

(72) Inventors: Syed S. Azam, Spring, TX (US); Alexander Williams, Spring, TX (US); David Nypaver, Spring, TX (US); Gregory Staten, Spring, TX (US)

(73) Assignee: Hewlett-Packard Development Company, L.P.

( * ) Notice: Subject to any disclaimer, the term of this patent is extended or adjusted under 35 U.S.C. 154(b) by 0 days.

(21) Appl. No.: 17/419,044

(22) PCT Filed: Jul. 31, 2019

(86) PCT No.: PCT/US2019/044433
§ 371 (c)(1),
(2) Date: Jun. 28, 2021

(87) PCT Pub. No.: WO2021/021176
PCT Pub. Date: Feb. 4, 2021

(65) Prior Publication Data
US 2022/0148483 A1 May 12, 2022

(51) Int. Cl.
*G09G 3/20* (2006.01)
*G09G 5/02* (2006.01)
(Continued)

(52) U.S. Cl.
CPC ... *G09G 3/2003* (2013.01); *G09G 2320/0666* (2013.01); *G09G 2354/00* (2013.01); *G09G 2360/18* (2013.01)

(58) Field of Classification Search
CPC .......... G09G 3/2003; G09G 5/02; G09G 5/06; G09G 5/024; G09G 5/10; G09G 5/39; G09G 5/391; G09G 5/42; G09G 2320/02; G09G 2320/0233; G09G 2320/0242; G09G 2320/0285; G09G 2320/04; G09G 2320/06; G09G 2320/0626; G09G 2320/0666; G09G 2320/0673; G09G 2320/0693; G09G 2354/00; G09G 2360/18; G06T 11/001; H04N 1/60; H04N 1/6019; H04N 1/6025; H04N 1/6027; H04N 1/6033;
(Continued)

(56) References Cited

U.S. PATENT DOCUMENTS 7,760,203 B1 * 7/2010 Hao ...................... G06T 11/206
345/440.2
9,826,898 B1 11/2017 Jin et al.
(Continued)

FOREIGN PATENT DOCUMENTS

KR 20180073296 A 7/2018
TW M509503 U 9/2015

*Primary Examiner* — Wesner Sajous
(74) *Attorney, Agent, or Firm* — Quarles & Brady LLP

(57) ABSTRACT

In an example display system, a range of colors around a region may be identified and compared to a color of the region with respect to a perception threshold. In that example, a modification of the color within the region may be determined based on the range of colors around the region and a display may be caused to present the region in a modified color based on the range of colors around the region with respect to the perception threshold.

15 Claims, 8 Drawing Sheets

(51) Int. Cl.
*G09G 5/06* (2006.01)
*G09G 5/39* (2006.01)
*H04N 1/60* (2006.01)
*H04N 9/64* (2023.01)
*H04N 9/77* (2006.01)
*H04N 9/69* (2023.01)
*H04N 9/73* (2023.01)

(58) Field of Classification Search
CPC .. H04N 1/6038; H04N 1/6041; H04N 1/6055; H04N 1/6058; H04N 1/6066; H04N 1/6077; H04N 5/57; H04N 9/64; H04N 9/69; H04N 9/73; H04N 9/77; G06F 3/048; G06F 3/0481; G06F 3/0482; G06F 3/0484; G06F 3/04845; G06F 3/04842; G06F 3/04847
USPC ......................................................... 345/593
See application file for complete search history.

(56) References Cited

U.S. PATENT DOCUMENTS

| | | | |
|---|---|---|---|
| 9,984,609 | B2 | 5/2018 | Kim et al. |
| 2007/0052735 | A1 | 3/2007 | Chou |
| 2007/0091113 | A1 | 4/2007 | Jones et al. |
| 2011/0255218 | A1 | 10/2011 | Pakula et al. |
| 2012/0287144 | A1* | 11/2012 | Gandhi ................ G09G 3/2029 345/589 |
| 2014/0340434 | A1* | 11/2014 | El-Ghoroury ........ G09G 3/3413 345/88 |
| 2016/0189672 | A1* | 6/2016 | Demos .................... G09G 5/02 345/589 |
| 2018/0043257 | A1 | 2/2018 | Stevens |

\* cited by examiner

1000 ⤸

1002 IDENTIFY A COLOR RANGE OF A TARGET AREA

1004 COMPARE PIXELS OF NEIGHBOR AREA TO A PERCEPTION THRESHOLD

1006 CAUSE A DISPLAY TO PRESENT A MODIFIED PIXEL BASED ON THE COMPARISON OF TARGET AREA AND NEIGHBOR AREA

1102 DETERMINE A COLOR OF A TARGET REGION IS OUTSIDE A PERCEIVABLE COLOR RANGE

1104 SELECT AN ALTERNATIVE COLOR WITHIN THE PERCEIVABLE COLOR RANGE

1106 IDENTIFY A NEIGHBOR REGION COLOR

1108 DETERMINE THE NEIGHBOR REGION COLOR IS WITHIN A PERCEPTION THRESHOLD WITH RESPECT TO THE ALTERNATIVE COLOR

1110 CAUSE A PATTERN TO APPLY THE TARGET REGION IN RESPONSE TO THE DETERMINATION OF THE PERCEPTION THRESHOLD

*FIGURE 11*

COLOR MODIFICATION BASED ON PERCEPTION TOLERANCE

BACKGROUND

Images are processed for use with computing machines, such as a print apparatus or a computer display. Image processing may include color calibration or other operations to ensure colors are reproduced accurately with respect to the creator's intentions. A monitor scaler may reproduce colors within a gamut corresponding to the display's capabilities.

BRIEF DESCRIPTION OF THE DRAWINGS

FIGS. 10-14 are flow diagrams depicting example methods for operating a display device.

DETAILED DESCRIPTION

Figure 1:
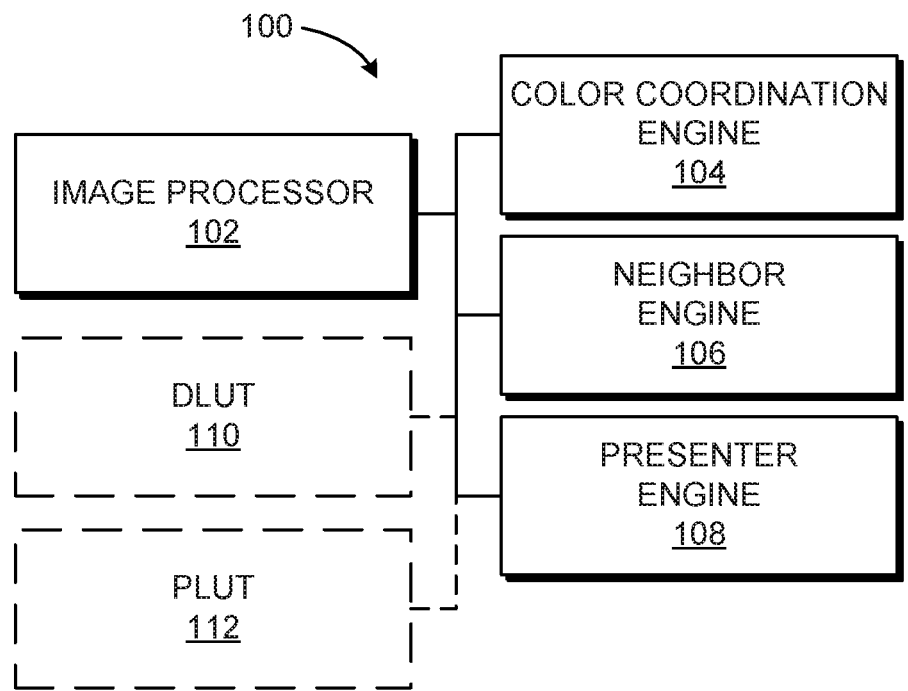
FIGS. 1 and 2 are block diagrams depicting example display systems.

In the following description and figures, some example implementations of display apparatus, display systems, display user interfaces (UI), and/or methods of operating a display device are described. In examples described herein, a "display device" is an electronic device capable of presenting content visually. Such display devices may include a screen such as a liquid crystal display (LCD) panel, an organic light-emitting diode (OLED) panel, a micro light emitting diode (μLED), or other display technology. In some examples, a display device may also include circuitry to operate the screen, such as a monitor scaler. A display device may be an external peripheral of a host computer, such as a monitor connectable to a desktop computer, or may be an integrated component, such as an all-in-one desktop computer, a laptop computer, a tablet computer, or a mobile phone.

Users of such devices may consume content visually from a display device by generating colors associated with a source image on a screen. In this manner, colors may be reproduced on different devices based on the source image. However, many devices have a limited, device-specific color gamut, and therefore, not all displays may reproduce colors in the same way.

Some users may perceive colors produced by a display differently from other users. For example, two viewers of a display may perceive the display as presenting different colors if one viewer is color blind and the other viewer is not color blind. Some computer systems include capabilities to adjust displayable colors to assist personalized visualizations, such as assist user with color blindness. For example, a computer application may be able to set colors of the image source to present in "color blind mode," where of a number of common colors outside the perceivable range for color blindness are exchanged for those within the color blindness perceivable range. Even though many color blind people are categorized into specific classifications, such as deuteranopia or protanopia, each person may have personalized tolerances to perception of colors. In this manner, a generalized preset may be limited in the assistive capabilities for each and every affected person. Any use of the word "color" herein may encompass tonality, such that a distinction between colors may be better described as a distinction between tone for a color blind user, for example.

Various examples described below relate to coordinating presentation of colors in accordance with a user's personalized color profile. As described herein, a display system may include personalized color alternatives and may identify when a color modification may lose perceptibility based on context. In some examples, color schemes operated at the level of an application or operating system executing on a host computer device, may, instead, be managed by hardware of the display device to coordinate color perception at the final output stage. By verifying what colors to adjust and their perceptibility (as indicated by a user) at the display-specific color level, modification can be made to ensure the colors are identified in a desired way by a user. Indeed, by maintaining fidelity to the content creator's source, and limiting adjustments to identified problematic colors as well as their location with respect to other colors on the screen, a user may improve perception of color differentiations intended by the content creator, for example.

Figure 2:
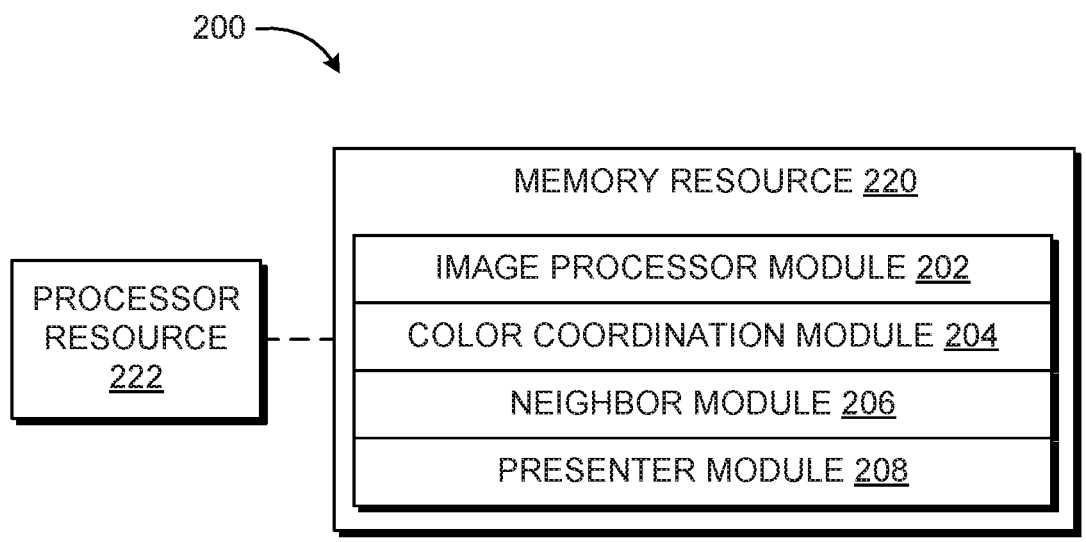

FIGS. 1 and 2 are block diagrams depicting example display systems 100 and 200. Referring to FIG. 1, the example display system 100 of FIG. 1 generally includes an image processor 102, a color coordination engine 104, a neighbor engine 106, and a presenter engine 108. In general, the image processor 102 may operate a display with alternative colors and/or patterns based on analysis of pixel data to present and identification of any perception issues with neighbor pixel regions. Such display operation may be designated as a color modification mode.

The image processor 102 represents any circuitry or combination of circuitry and executable instructions to operate a display. For example, an image processor 102 may be circuitry to perform processing operations on image data, such as video data, and cause the processed data to present on a screen of a display device. Examples of an image processor include a video processor, a graphics processing unit (GPU), a scaler, a field-programmable gate array (FPGA), and the like. A scaler, as used herein, is circuitry of a display device that performs scaling of visual output from a host device to the size of the screen of the display device and operates the display device to present the visual output. For example, a scaler may perform image processing operations (such as converting video signal from one display resolution to another) and electrical control operations to coordinate emission of light from pixels to generate a perception of color. In this manner, the image processor 102 may include a processor resource with a specific control program to perform video processing operations, including scaling operations.

The color coordination engine 104 represents any circuitry or combination of circuitry and executable instructions to coordinate colors to be presented by a display. For example, the color coordination engine 104 may be a combination of circuitry and executable instructions that, when executed, cause the circuitry to determine a modification is warranted with respect to a user's color preferences and identify an alternative presentation of a target region based on the user's color preferences. A modification may include a change to a color or tone, such as by adding a pattern to a region of an alternative color or changing a hue, saturation, or other color attribute value corresponding to an alternative color (e.g., to make the alternative color more perceivable to the user). The color coordination engine 104 may utilize resources to determine how to coordinate colors to be presented by the display. For example, the color coordination engine 104 may be a combination of circuitry and executable instructions that, when executed, cause the circuitry to compare a color identifier entry in a device-specific look up table (DLUT) 110 that is associated with a color to be presented a target region of a display to a color identifier entry in a personalized look up table (PLUT) 112, retrieve a perception threshold of the color at the target region from the PLUT 112 and an alternative presentation identifier corresponding to the color identifier, and determine a modification corresponding to the alternative presentation identifier based on the perception tolerance and the DLUT 110. The perception threshold, as used herein, is a value, character, classification, or other identifier that represents a perception tolerance.

The DLUT 110 is a data structure that represents a range of colors and/or tonalities presentable by the display device, e.g., the full spectrum of colors of the color gamut associated with the capabilities of the display device. The PLUT 112 is a data structure that represents color-related preferences of a user. For example, the PLUT 112 may contain user-selected colors and/or tonalities that map to colors of a source image and/or colors presentable by the display device that the user would prefer to be shown as a different color. In this manner, the PLUT 112 may designate differentiations in the color space presentable by a display device. Such a look up table is helpful for those with perception affected by color blindness, for example, where a color that is not well perceived may be exchanged for a different color that is better perceived by that user. Examples of a data structure useable as a PLUT or DLUT include a look up table (with any number of dimensions), a mathematical matrix, a dictionary, or any other data structure capable of storing associations (e.g., mappings) between a first identifier and a second identifier. In some examples, the PLUT 112 may include both an alternative color and a pattern associated with each color entry, such that the color coordination engine 104 and the presenter engine 108 generate an alternative color for a target region, and, if that target region is imperceptibly different as defined by a user using a perception tolerance, then a pattern may be overlaid on the target region to make the target region identifiably different from the neighboring region.

Any number of colors may include entries in the DLUT and/or the PLUT. For example, a user may generally have a viewable color profile corresponding to protanopia where pink and purple are mostly perceived as blue. The PLUT may include a perception tolerance degree or perception tolerance classification corresponding to pink and/or purple such that if pink is to be displayed next to purple or purple is to be displayed next to pink (where both regions would appear as blue to the user with protanopia), the pink and purple region may have a pattern (using a color perceivably different from blue, for example) applied to that region to designate the pink region from the purple region. In some examples, both regions may have a pattern applied where the pattern is perceptively different for each region to allow a user to identify the designation between the pink region and the purple region. However, another user with protanopia may have higher or lower perceptive tolerance to pink and/or purple or in other words may have an easier or harder time distinguishing pink and/or purple with respect to an average user with protanopia. In such a situation, a first user with protanopia may prefer to have a pattern to assist differentiation of a pink display region while a second user with protanopia may prefer to not display a pattern because the second user is able to sufficiently distinguish the pink display region, for example.

The neighbor engine 106 represents any circuitry or combination of circuitry and executable instructions to identify a color of a neighbor region adjacent the target region and determine whether the color of the neighbor region is within a color range (e.g., an imperceptible color range) based on a perception tolerance associated with the color of the target region and the color of the neighbor region. For example, the neighbor engine 106 may be a combination of circuitry and executable instructions that, when executed, cause the circuitry to identify pixels of a neighbor region (e.g., neighbor pixels) adjacent the target region that are within a color range corresponding to the color identifier based on the perception tolerance retrievable from a PLUT 112.

The presenter engine 108 represents any circuitry or combination of circuitry and executable instructions to cause the image processor 102 to operate a screen to present the target region in a modified property corresponding to the alternative presentation based on a perception tolerance of the color to be presented at the target region. The modified property may be a modified color (e.g., modified tone) and/or color pattern applied over the target region. For example, the presenter engine 108 may be a combination of circuitry and executable instructions that causes the image processor 102 to change the target region to be a different color or include a pattern if the alternative color is too similar to the color presented at the neighbor region. For another example, the neighbor engine 106 may include a combination of circuitry and executable instructions that identifies a plurality of groups of pixels that are within the color range based on the perception tolerance and the presenter engine 108 is a combination of circuitry and executable instructions that causes a color pattern to be applied across the plurality of groups of pixels by interchanging individual pixels at each group among a plurality of approved colors in the PLUT 112, such as a selection of colors in a perceptible range of color that are displayed in a pattern. The presenter engine 108 may include circuitry that generates instructions to operate the image processor 102. In other examples, the engines 104, 106, and 108 may be implemented in the image processor 102 as part of the image processor's programming or otherwise integrated with the image processor 102.

Figure 3:
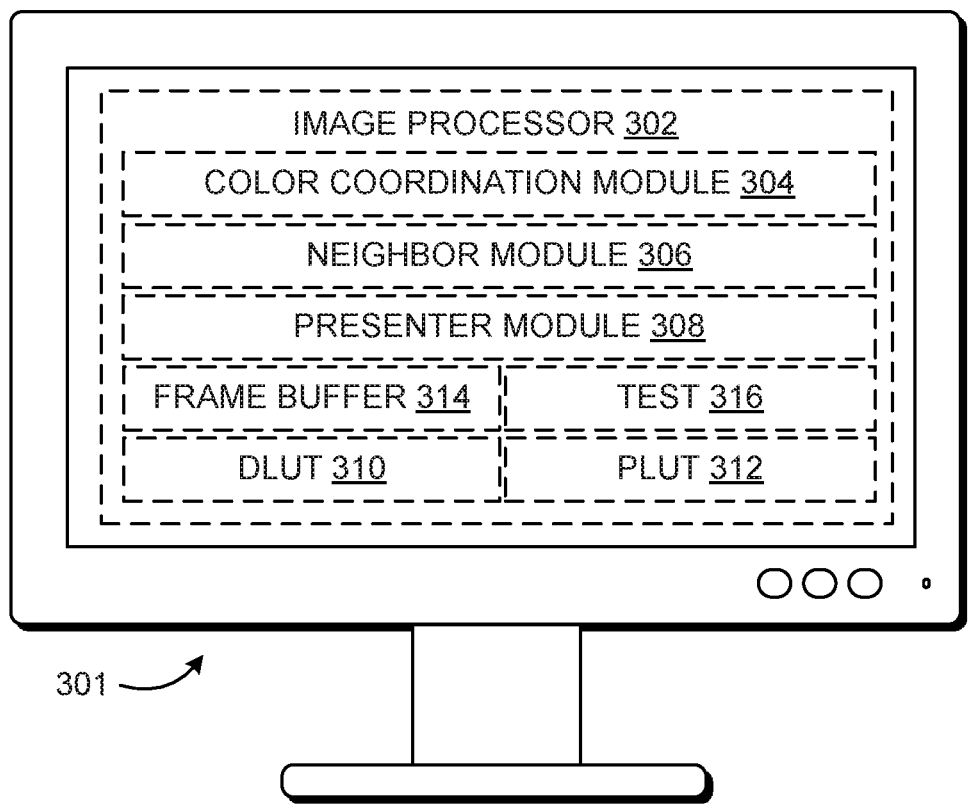
FIG. 3 depicts an example display device.

In some examples, functionalities described herein in relation to any of FIGS. 1-3 may be provided in combination with functionalities described herein in relation to any of FIGS. 4-14.

FIG. 2 depicts the example system 200 may comprise a memory resource 220 operatively coupled to a processor resource 222. Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an image processor module 202, a color coordination module 204, a neighbor module 206, and a presenter module 208. The image processor module 202, the color coordination module 204, the neighbor module 206, and the presenter module 208 represent program instructions that when executed cause function of the image processor 102, the color coordination engine 104, the neighbor engine 106, and the presenter engine 108 of FIG. 1, respectively.

The processor resource 222 may carry out a set of instructions to execute the modules 202, 204, 206, 208, and/or any other appropriate operations among and/or associated with the modules of the system 200. For example, the processor resource 222 may carry out a set of instructions to identify a range of colors around a pixel region, compare the range of colors around the pixel region to a color within the pixel region with respect to a perception threshold, determine a modification of the color within the pixel region based on the range of colors around the pixel region, and cause a display to present the pixel region in a modified color based on the range of colors around the pixel region with respect to the perception threshold. In that example, the perception threshold may be a numerical value or other classifier to designate a degree of the perception tolerance of a color and the modified color may be a different hue, a different shade, a completely different color, or modified by a color pattern applied to the region. For another example, the processor resource 222 may carry out a set of instructions to analyze pixel data in a frame buffer corresponding to the pixel region for any values outside of the perception threshold determined by a personalized color profile, flag the pixel data to be display in an alternative color or pattern within a visible range defined by the personalized color profile, and adjust (for any flagged data) the color within the pixel region to be changed to a lighter shade within a visible range of a personalized color profile or modify the pixel region to include a pattern of the color within the pixel region with a second color within the visible range of the personalized color profile. For yet another example, the processor resource 222 may carry out a set of instructions to store a lookup table of values of color that are perceived by a user, compare the values to a color blind preset generated from a user preference and color blindness type, alter a color value of pixel data in a frame buffer in response to the comparison of the color value of the pixel data in the frame buffer to values of the color blind preset, and cause a screen of a display to present the altered color value in response to a drawing instruction corresponding to the pixel data of the frame buffer.

Figure 9:
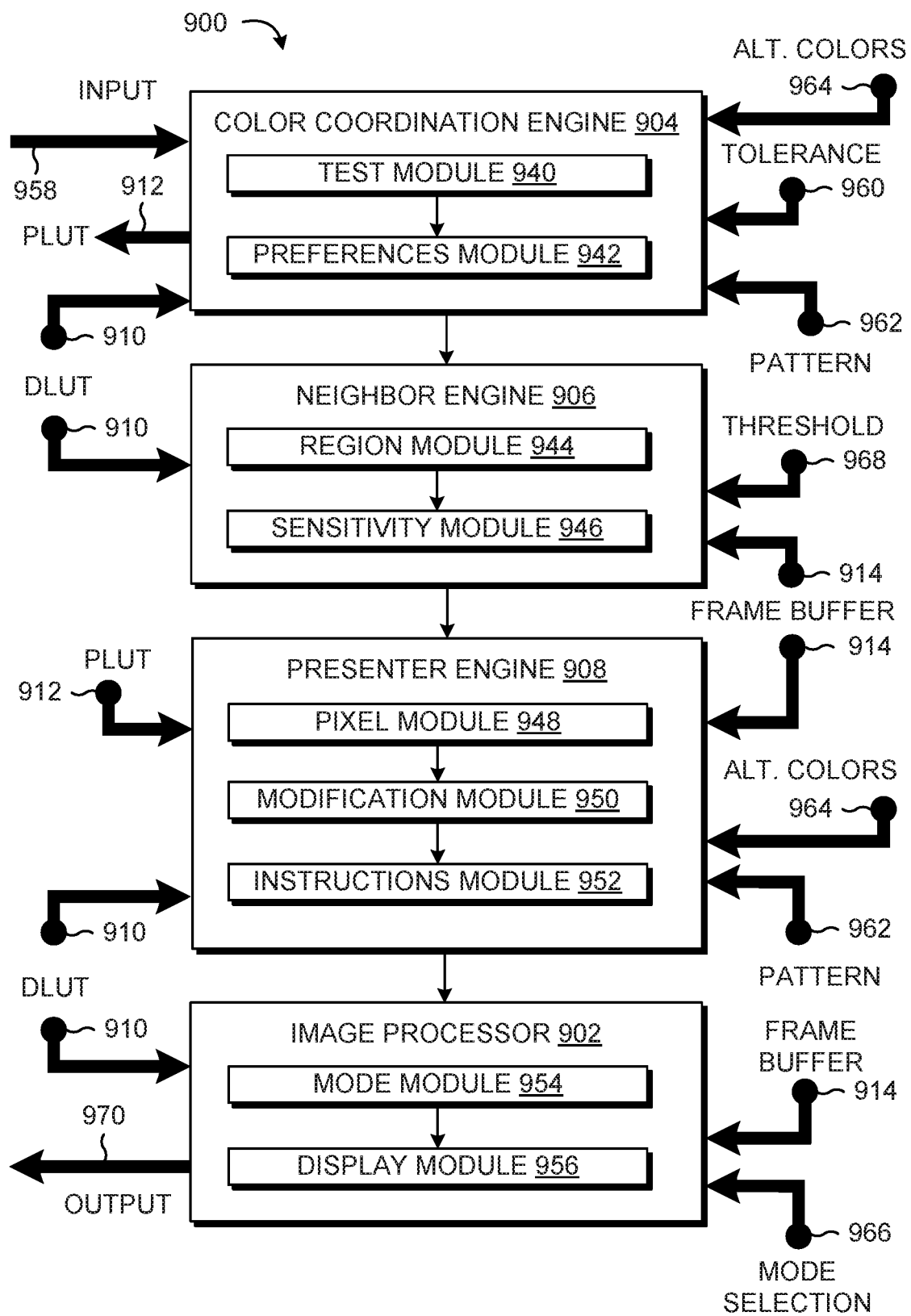
FIG. 9 depicts example components useable to implement an example display system.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 9 depicts yet another example of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables coordinating color presentation of a display by fetching, decoding, and executing modules 202, 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 2. A memory resource may be integrated in the same device as a processor resource or it may be separate but accessible to that device and the processor resource. A memory resource may be distributed across devices.

In the discussion herein, the engines 104, 106, and 108 of FIG. 1 and the modules 202, 204, 206, and 208 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

In some examples, the system 200 may include the executable instructions may be part of an installation package that when installed may be executed by a processor resource to perform operations of the system 200, such as methods described with regards to FIGS. 4-14. In that example, a memory resource may be a portable medium such as a compact disc, a digital video disc, a flash drive, or memory maintained by a computer device, such as a server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIG. 3 depicts an example display device 301. The example display device 310 generally includes an image processor 302 (such as a scaler) having a resource (such as a memory resource) with information stored thereon to assist performance of the functionalities described herein. Referring to FIG. 3, the image processor 302 may include a color coordination module 302, a neighbor module 306, and a presenter module 308 that are the same as the color coordination module 204, the neighbor module 206, and the presenter module 208 of FIG. 2. The image processor 302 may include a frame buffer 314 for receiving image data to be presented on a screen of the display device 301. The frame buffer 314 may be a memory resource capable of storing data corresponding to a frame of visual content from a source. The frame buffer 314 may include enough storage capacity to hold data corresponding to multiple frames concurrently. The data in the frame buffer 314 may be processed by the image processor (e.g. the image processor 302) in real-time.

The image processor 302 may include instructions stored thereon that when executed cause the display device 301 to present an on-screen display (OSD) menu. The image processor 302 may include instructions stored thereon that when executed cause the image processor 302 to operate the display device 301 to perform a color test 316. The image processor 302 may store a DLUT 310 and a PLUT 312, which represent the same as the tables described with respect to the DLUT 110 and the PLUT 112 of FIG. 1. In this manner, the engines 104, 106, and 108 may be integrated on the display device 301, such as integrating the engines and/or modules on a video processor or scaler integrated circuit. A color test may be performable to assist adjustment of colors displayed over time, such as a color shift of the display due to aging of the panel. In other examples, the values of the PLUT may be adjusted for a planned color shift over time or based on a measured color space such that a range of colors may become within a zone of sensitivity over time.

The image processor 302 may execute the test 316, which is a control program to operate the display to present a color test. For example, the image processor 302 may execute the color coordination module 304 to cause a screen of the display device 301 to generate a color test using colors of the DLUT 310, identify color input in response to the color test presented on the display, determine a tolerance to an alternative color corresponding to a color of the DLUT based on the color input from the user, and create an entry in the PLUT 312 that associates a color input from a user with a color pattern. In some examples, the image processor 302 may execute the color coordination module to select a color blind preset based on the color input entered during the color test and the PLUT 312 is updated via the image processor 302 to correlate an entry matched with a color of the set of color blind presets with a corresponding color blind preset color and a corresponding pattern.

Referring to FIGS. 1-3, the engines 104, 106, and 108 of FIG. 1 and/or the modules 202, 204, 206, and 208 of FIG. 2 may be distributed across devices, such as a display device 301, a local host device, a server, or a combination thereof. The engine and/or modules may complete or assist completion of operations performed in describing another engine and/or module. For example, the image processor 302 of FIG. 3 may request, complete, or perform the methods or operations described with the image processor 102 of FIG. 1 as well as the color coordination engine 104, the neighbor engine 106, and the presenter engine 108 of FIG. 1. Thus, although the various engines and modules are shown as separate components in FIGS. 1 and 2, in other implementations, the functionality of multiple engines and/or modules may be implemented as a single engine and/or module or divided in a variety of engines and/or modules. In some example, the image processor 302 of the system 301 may perform example methods described in connection with FIGS. 1-14.

Figure 4:
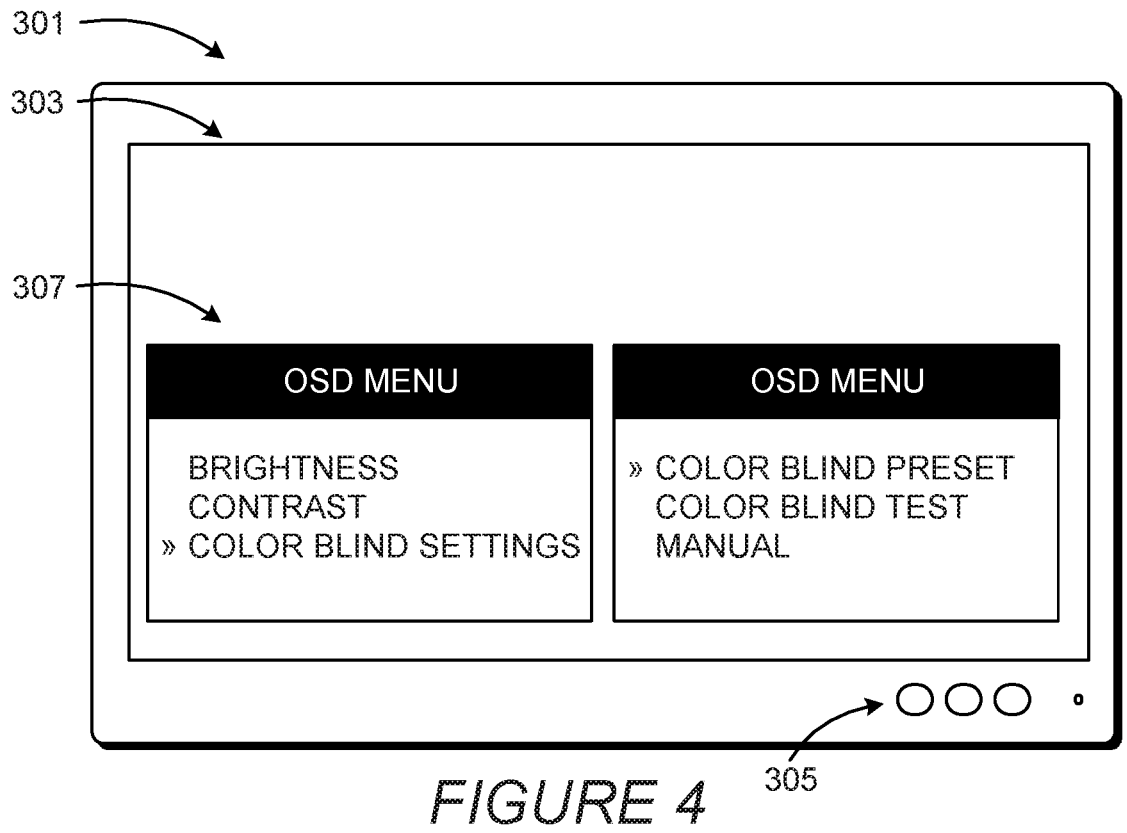
FIGS. 4-8 depict example user interface elements displayable on an example display device.

FIGS. 4-8 depict example user interface elements displayable on an example display device 301. Referring to FIG. 4, the display device 301 may present an OSD menu 307 on a screen 303 (e.g., LCD panel or OLED panel). The OSD menu 307 presents information and functionality of the display device 301. The OSD menu 307 of a display device 301 with a display system as described herein may display color coordination functionality, such as labeled as "color blind settings" in the OSD menu 307 depicted in FIG. 4. Such color blind settings may include options for selecting a color blind preset to coordinate colors with preset color profiles adjusted for a type of color blindness, operating a color blind test to identify the type and/or sensitivity of color blindness of a user, and manually selecting a color and perception sensitivity of a selected color. The OSD menu 307 may be operated using input, such as keyboard input or button input from on-display buttons 305, as examples.

Figure 5:
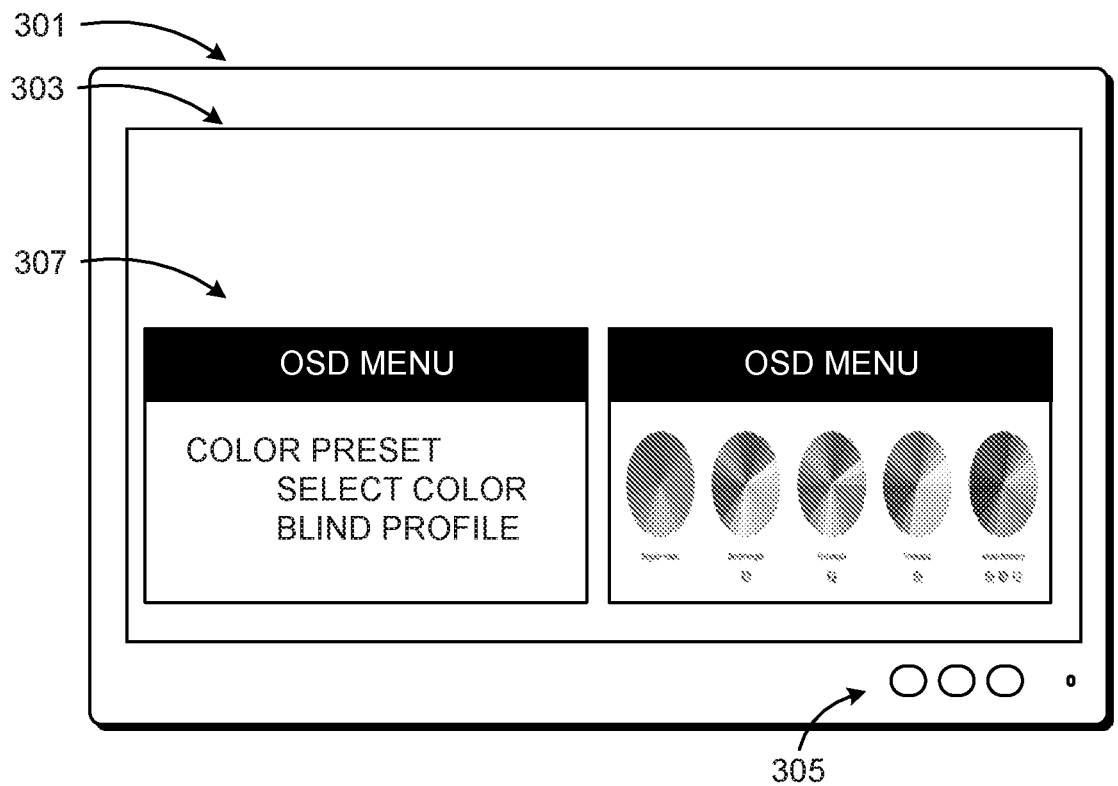

Referring to FIG. 5, the OSD menu 307 may present a capability of selecting a preset color profile based on a classification of color blindness. For example, the OSD menu 307 may present the option to select a deuteranopia profile, a protanopia profile, a tritanopia profile, a monochromacy profile, and a regular vision profile.

Figure 6:
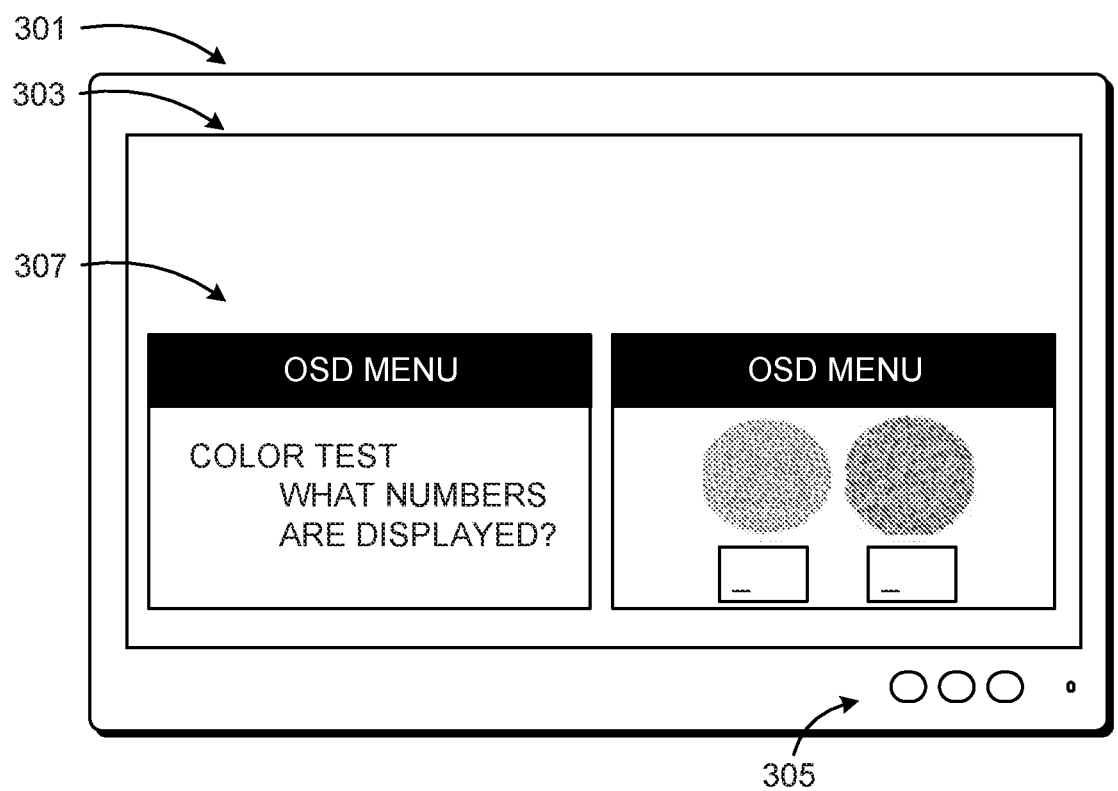

The OSD menu 307 may present a color test, such as shown in FIG. 6, and generate a PLUT based on the responses to the color test.

Figure 7:
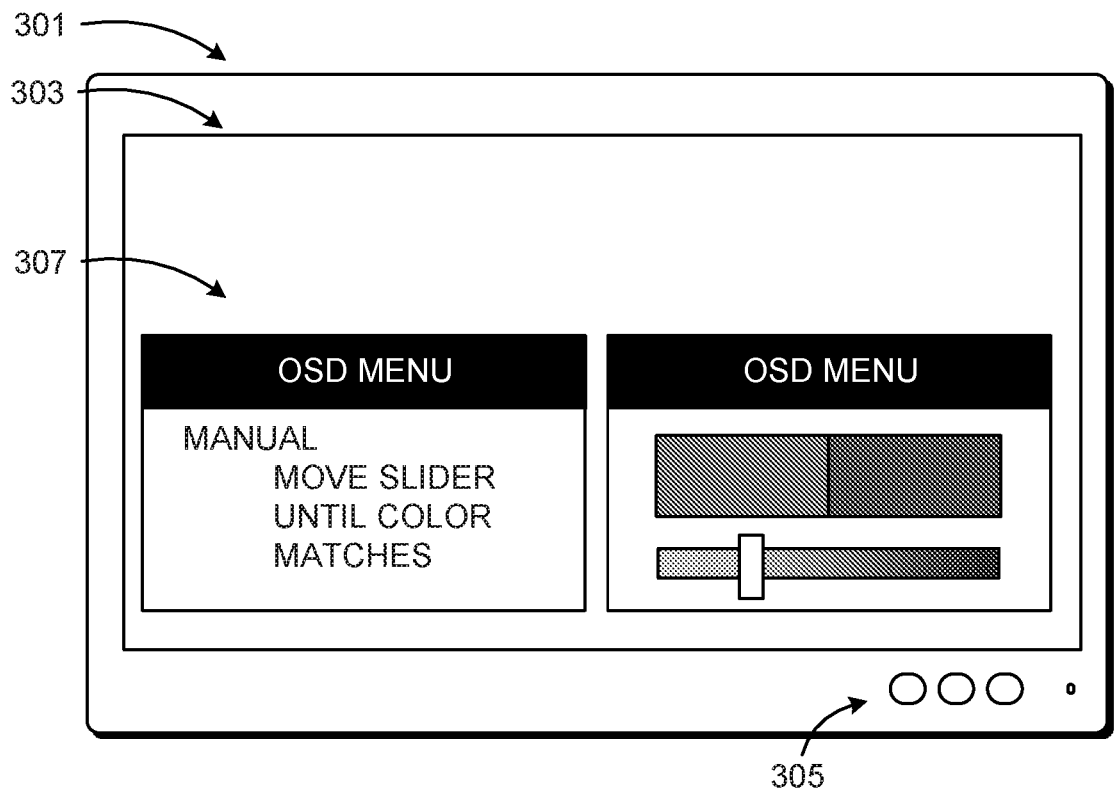
Figure 8:
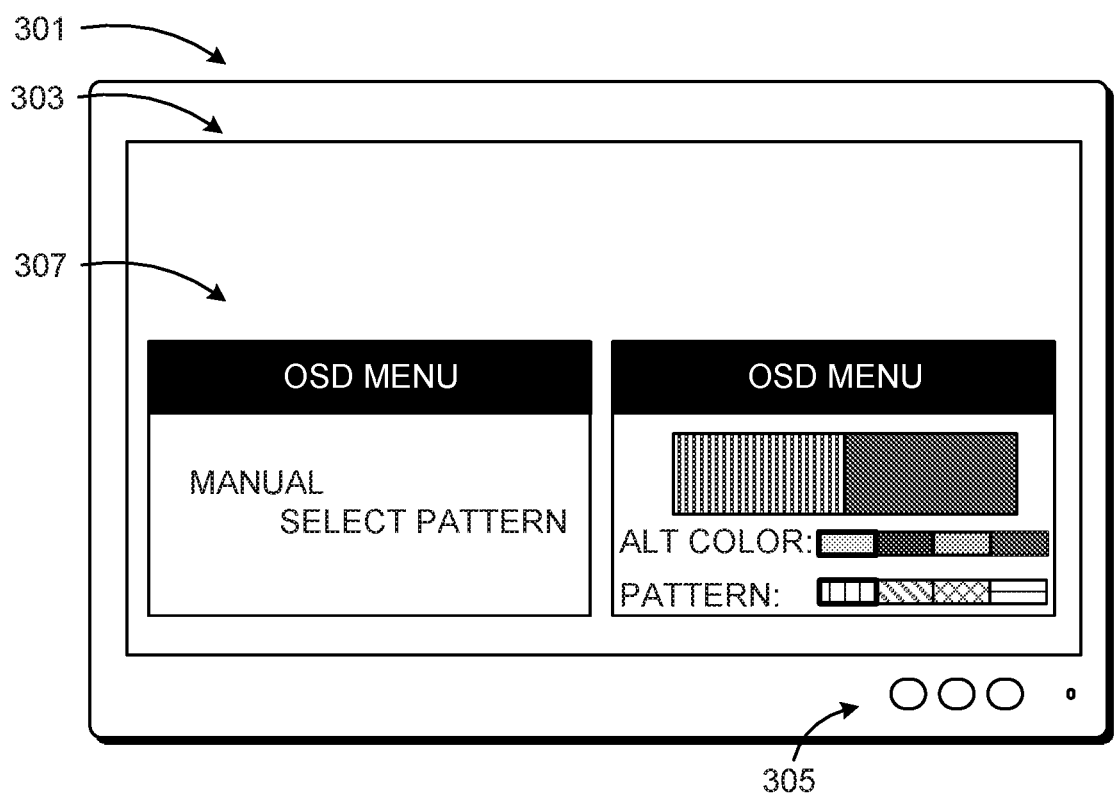

Referring to FIGS. 7 and 8, the OSD menu 307 may present a capability of manually adjusting the entries of the PLUT. For example, with reference to FIG. 7, a box of color may be presented with an adjustable box of color next to it and the user can adjust the color using a slider to designate when the colors of each box become imperceptibly different for the user (or when the boxes become distinguishable—depending on implementation). A perception tolerance for that color may be generated based on the user input and stored as a perception threshold for that color in the PLUT.

The OSD menu 307 may present a capability to designate a difference between the two colors of FIG. 7 when the colors are imperceptibly close in a color range. In other examples, the OSD menu 307 may present a capability to designate similarity between two colors of FIG. 7 when the colors are perceptibly distinguishable in a color range. Using a slider may allow for accurate identification of the perception tolerance of a user for a distinguishing two colors, for example. The OSD menu 307 of FIG. 8 may offer a selection of patterns to choose from and the user may choose the pattern that assists the user in identifying a differentiation in the colors as desired. The selectable options shown in FIG. 8 represent modifications to a color to make the color more distinguishable (from the reference color) and, thus, the options shown are an example that should not be limiting. For example, a selection may be to change the hue, saturation, or luminance of the alternative color rather than selection of a pattern. By allowing the user to choose an alternative color and/or a pattern to display in the alternative color, the user may adjust the colors of the display to present in a format that allows for colors to be perceivably different in cases where a color may map closely to another color (such as in a color blind preset profile). Indeed, the use of a pattern for different colors perceived as the same may be useable with the selection of a color blind preset profile.

FIG. 9 depicts example components useable to implement example display systems, such as display system 900. Referring to FIG. 9, the example components of FIG. 9 generally include a color coordination engine 904, a neighbor engine 906, a presenter engine 908, and an image processor 902.

The example components of FIG. 9 may be implemented on a compute device, such as display device 301 of FIG. 3.

Input 958, such as a pixel data being received into a frame buffer 914, is received by the color coordination engine 904. The color coordination engine 904 may include program instructions, such as a test module 940 and a preferences module 942, to assist coordinating color modifications of colors to be presented on a display. The test module 440 represents program instruction that when executed cause a processor resource to perform a color test on a display and use the input to identify color presentation preferences of a user, such as alternative colors 964 to use, a pattern 962 to improve differentiation, and a perception tolerance 960 (e.g., when to use the alternative colors 964 and/or pattern 962). A PLUT 912 may be generated and/or modified by the color coordination engine 904, such as based on input to a color test or manual settings presentable to a user. The preferences module 942 represents program instruction that when executed cause a processor resource to identify a target region of the display with a color within a perception tolerance (or beyond a perception threshold depending on implementation) where the user's preferences should be applied over the source color information of the pixel data in the frame buffer. Such a decision may be based on the colors as presentable by the display (e.g., defined by the DLUT 910).

The neighbor engine 906 may be executed to check if using an alternative color at a target region of pixels affects perceptibility of a neighbor region of pixels. The neighbor engine 906 may include program instructions, such as a region module 944 and a sensitivity module 946. The region module 944 represents program instruction that when executed cause a processor resource to identify a region of pixels adjacent the target region, such as a neighbor region that is the substantially the same color across the neighbor region to be compared to the substantially same color across the target region. The region may include a plurality of pixels, for example, in the frame buffer 914 that are designated for presentation in an area adjacent or otherwise near the target region. The sensitivity module 946 represents program instruction that when executed cause a processor resource to determine whether the neighbor region identified by executing the region module 944 is imperceptibly close to the color of the target region based on a perception threshold 968. Execution of the sensitivity module 946 by the neighbor engine 906 may flag the pixel data in the frame buffer 914 with a perception flag that designates the color of the target pixel data as being imperceptibly close to the colors to present of the neighbor pixel data in the frame buffer 914.

The presenter engine 908 may operate to modify the presentation of pixel data, such as modifying any pixel data with a perception flag designated. The presenter engine 908 may include program instructions (such as a pixel module 948, a modification module 950, and an instructions module 952) to assist the presenter engine 908 in determining which pixels are to be modified for presentation and how to modify the pixels identified for modification. The pixel module 948 represents program instruction that when executed cause a processor resource to identify a pixel to be modified based on a review of whether presenting a target pixel region in an alternative color 964 is to generate an issue with perceptibility with a neighbor pixel. For example, the pixels may be designated in the frame buffer 914 with a flag for additional modification in addition to presentation in the alternative color based on a perception tolerance corresponding to the color (and associated with that color entry in the PLUT 912).

The modification module 950 represents program instruction that when executed cause a processor resource to cause a change to the pixel data associated with the target pixel region to be displayed in the alternative color(s) 964. For example, the pixel data of the frame buffer 914 is modified via execution of the modification module 950, to present the pixel in accordance with a pattern 962 to be applied to the target region. The instructions module 952 represents program instruction that when executed cause a processor resource to generate instructions understandable by the image processor 902 to produce the modification of the pixel data on a display device.

The image processor 902 causes operation of a display device to generate an image using the pixel data for the target region and neighbor region, such as based on data of the frame buffer 914 as modified based on the PLUT 912 and DLUT 910. The image processor 902 may include program instructions, such as the mode module 954 and the display module 956, to assist operation of the display device to present the modified pixel data according to the user's preferences. The mode module 954 represents program instruction that when executed cause a processor resource to identify whether the user would like the modified pixels to present as modified under the current context. For example, execution of the mode module 954 may check a color blind mode toggle based on user selection to determine whether the pixel data in the frame buffer 914 is to be presented in a regular mode or in a color blind assist mode (e.g., with or without the modifications identified by execution of the color coordination engine 904, the neighbor engine 906, and the presenter engine 908). In other examples, a machine learning technique may be used to determine whether the pixels are to be presented as modified or unmodified based on context. The display module 956 represents program instruction that when executed cause a processor resource to cause electrical signals to be generated as output 970 to a screen (e.g., LCD panel or OLED panel) to cause the screen to illuminate pixels in accordance with the colors and locations designated by the pixel data in the frame buffer 914. In other examples, the output 970 may be machine-readable instructions that cause a screen to operate according to pixel data as modified by the display system 900.

FIGS. 10-14 are flow diagrams depicting example methods (1000, 1100, 1200, 1300, and 1400) of operating a display device. Referring to FIG. 10, an example method 1000 of operating a display device may generally comprise identifying a color range of a target area, comparing pixels of neighbor area to a perception threshold, and causing a display to present a modified pixel of the target area. The operations of method 1000 may be performable by execution of an image processor, such as a scaler, or a display system including the engines 104, 106, and 108 of FIG. 1, for example.

At block 1002, a color range of a target area is identified. The target area may include an alternative color to be presented, based on a color blindness preset, for example. At block 1004, the pixels of the target area and a neighbor area are compared to each other with respect to a perception threshold. For example, the color of pixels of the target area may be within a color range (defined by the perception threshold) of the color of pixels of the neighbor area. At block 1006, a display is caused to present a pixel of the target area to be modified based on the comparison at block 1004. For example, if the colors of the target and neighbor areas are imperceptibly close as guided by the perception threshold, then a pixel of the target area may be modified so that the target region displays a perceptively different color and/or a pattern to designate the target area as different from the neighbor area.

Referring to FIG. 11, an example method 1100 of operating a display device may generally comprise determining a first color is outside a color range, selecting a second color within the color range, identifying a third color of a neighbor region, determining that the third color and the second color are within a perception threshold, and causing a pattern to apply to a target region to indicate the color of the target region is different from the color of the neighbor region. The operations of method 1100 may be performable by execution of an image processor, such as a scaler, or a display system including the engines 104, 106, and 108 of FIG. 1, for example.

At block 1102, a color of a target region is determined to be outside a perceivable color range. For example, a first color value (corresponding to a first color) of first pixel data (corresponding to a first pixel region) in a frame buffer of the display is determined by an image processor to be outside a color range, such as a range defined by a PLUT.

At block 1104, an alternative color within a perceivable color range is selected. For example, a second color value (corresponding to a second color different from the first color discussed with respect to block 1102) may be an approved color of a PLUT and selected to be used instead of the original color of the target region.

At block 1106, a color of a neighbor region is identified. For example, a third color value of a second pixel data (corresponding to a second display region) is to be presented near or next to the target region (e.g., first display region). The third color in this example, may or may not be different from the first or second colors discussed with respect to blocks 1102 and 1104.

At block 1108, the color of the neighbor region is determined to be within a perception threshold with respect to the alternative color selected at block 1104. For example, the third color may be determined, by an image processor, to be imperceptibly different according to the perception threshold, such that a user (e.g., a color blind user) may not be able to differentiate between the first display region and the second display region. The perception threshold may designate a range of colors that are imperceptible with respect to a particular color (e.g., a target color). In other examples, the perception threshold may represent a percentage of a color as represented by red, green, and, blue where one of the subpixel colors is within an imperceptive value (such as between 0 and 255). In such examples, circuitry executing a display system (such as an image processor executing modules of FIG. 2) may identify a color value associated with the third color may be compared to a numerical range representing a range of values of a tone attribute (such as color saturation of a particular color) based on a perception threshold retrieved from a PLUT. Continuing with that example, the third color may be modified to increase or decrease the value of the tone attribute to be in a distinguishing numerical difference with the color range based on the perception threshold (e.g., if the third color is within 5% of the same tone value of the second color, which is designated by the perception threshold as imperceivably different, the tone attribute may be increased to 6% or greater to be perceivably distinguishable from the second color).

At block 1110, a pattern is caused to apply to a target region in response to the determination at block 1108. For example, in response to a determination that the third color is within a perception threshold with respect to the second color, an image processor causes modification of image data, such that a display generates a pattern applied to second color of the first display region to indicate the third color of the neighbor region is different from the second color. The pattern application is representative of color modifications discussed herein. Other such modifications may include a value change in hue, saturation, luminance, or one or more color channels in order to generate a local differentiation of similar neighbor regions.

Figure 12:
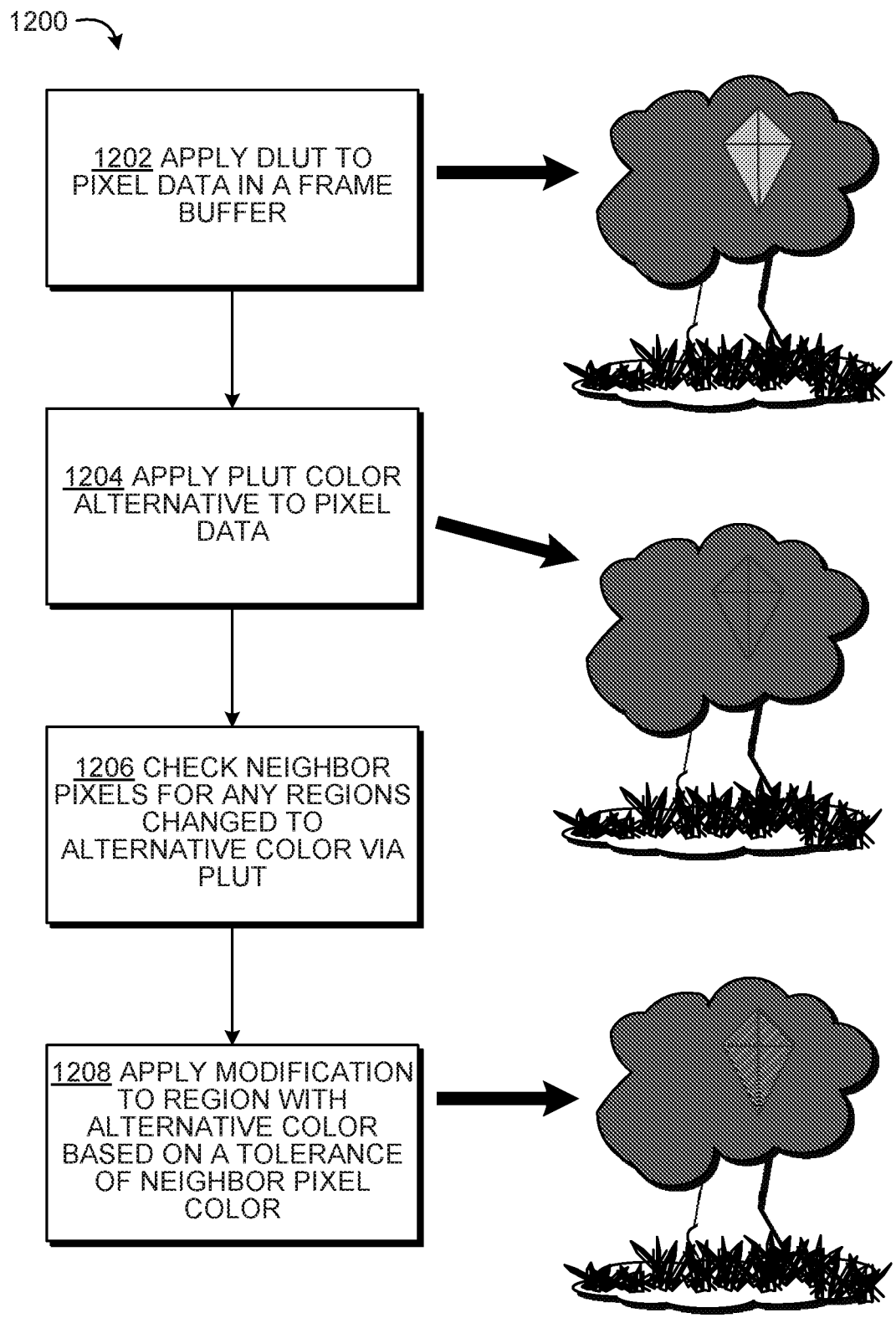

Referring to FIG. 12, a method 1200 of operating a display may generally include applying device-specific colors to an image source, applying a personalized color alternative to a device-specific color, check if such a change generates a perception issue, and apply a pattern at region to designate a differentiation to reduce the perception issue.

At block 1202, a color value of a DLUT is applied to pixel data in a frame buffer corresponding to a region of an image to display. For example, a source image having a color range may be in a frame buffer of a display in preparation to be presented on a screen and the color values of the source image are translated to color values usable with the display based on color values of the DLUT. An example, as shown in FIG. 12, is a scene of a tree with a kite stuck in the branches. In this example, the leaves of the tree are designated in a first color and the kite material is designated in a second color that is distinct from the first color with respect to presentability by the display (e.g., based on the DLUT values corresponding to the first and second color).

At block 1204, a color value of a PLUT is applied to the pixel data to generate a color alternative at a region of the image. For example, the colors to be presented on the display are filtered through a color profile personalization as defined by the PLUT such that a color identified for presentation is exchanged for an alternative color. In the example image source shown in FIG. 12, if the kite is red and the personalized color profile removes all reds from the scene to be displayed (such as to be displayed as green as the alternative color), then the kite is designated to be shown as green based on the PLUT and the green of the leaves of the tree may stay unaltered after applying the DLUT because the personalized color profile (as defined by the PLUT) generally allows for a region to display green colors without alteration (prior to review of neighbor regions which occurs at block 1206).

At block 1206, neighbor pixels associated with any regions changed to an alternative color via the PLUT are checked with regards to their perceptibility between the neighbor pixels and the target region. For example, if the kite region is changed, the neighboring tree trunk and tree leaves regions are checked for colors that may be imperceptibly close (based on a perception tolerance per color as defined by the PLUT) to the alternative kite color. In this case, as shown in FIG. 12 the resulting image has changed the kite color to be similar to the tree leaves making the kite difficult to distinguish within the tree leaves.

At block 1208, a modification is applied to a region with the alternative color, such as with a hue, shade, saturation, luminance, and/or pattern that is distinguishable beyond a perception tolerance of a color of the neighbor pixel. For example, with respect to the image shown in FIG. 12, a diagonal line pattern is applied to the kite region to distinguish the alternative green color of the kite region from the green color of the tree leaves. In this manner, any changes made to customize a color profile of images on a display may still allow for perceptive differences of regions as intended by a content creator. In some examples, rather than modify the whole target region, a portion of the target region may be modified. For example, the outline of the target region may be modified (e.g., the perimeter near the similarly-colored neighbor pixels) to generate a distinction for the target region with respect to a neighbor region.

Figure 13:
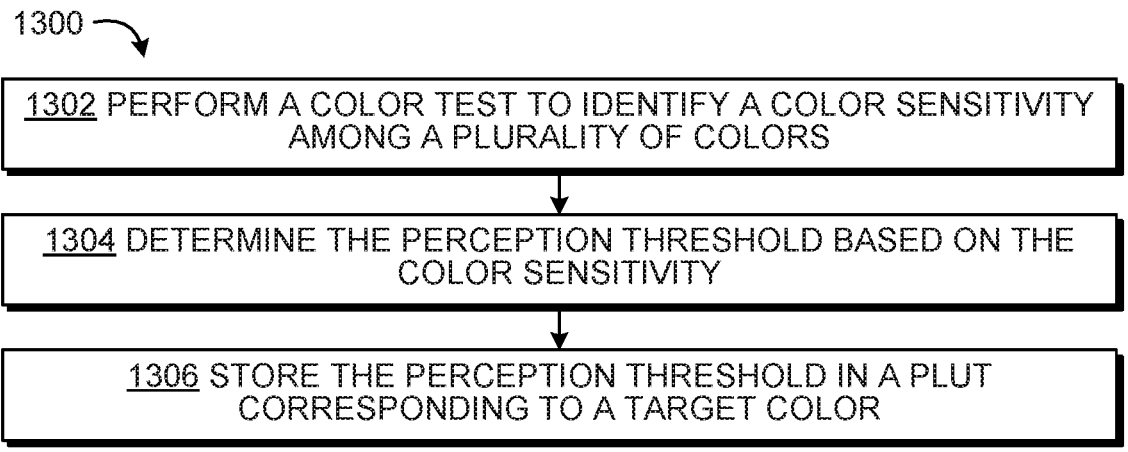

Referring to FIG. 13, an example method 1300 of operating a display device may generally include performing a color test, determining a perception threshold, and storing the perception threshold in a PLUT. The method 1300 may be used, such as by an image processor, in connection with operations of the methods 1000, 1100, 1200, and other functions as described herein.

At block 1302, a color test is performed with a gradual change in the testing color to identify when the testing color becomes perceptively similar (or perceptively different) to the target color. For example, a video processor may include a color testing program to present on a display, such as via an OSD menu, that uses user input to identify when a color changes from being distinguishable or indistinguishable from another color. In this manner, a color sensitivity may be determined for each tested color, such as testing each subpixel color to identify perceptible ranges of those colors (e.g., such as ranges between 0-255).

At block 1304, a perception threshold is determined based on a color sensitivity, such as the color sensitivity identified at block 1302. For example, a video processor of a display may calculate or otherwise identify a color sensitivity based on user inputs from a color test with regards to a particular color and then determine a perception threshold associated with the color, that when achieved, indicates a color is either indistinguishable or distinguishable (depending on implementation). In an example, a yellow color may have a perception threshold with respect to orange and purple color may have a perception threshold with respect to blue or red. In this manner, color pairs may be associated with perception thresholds and used to identify neighbor pixels, where neighbor pixels of one color may be indistinguishable at a different degree than another color with respect to a target color. In some examples, the perception threshold is used to determine a pattern type and a pattern differentiation color, such as where the perception threshold may indicate a very harsh pattern may be used to distinguish perceptible alternative colors with a higher perception threshold where as a subtle pattern may be used to distinguish perceptible alternative colors with a lower perception threshold. Indeed, different color pairs may be associated with different patterns, which may be designated by a user during a color test or manually selected.

At block 1306, the perception threshold determined at block 1304 is stored in a PLUT corresponding the tested color based on the identified color sensitivity (e.g., the degree of sensitivity and to what color corresponds the sensitivity). The perception threshold, as discussed elsewhere herein, may then be used when processing frame buffer data to determine when alternative colors and patterns are to be applied as defined by PLUT representing the personalize user color profile. For example, a display device may use a PLUT to cause a pattern differentiation color and the alternative color in a pattern type at the target display region based on the perception threshold associated with the alternative color entry in the PLUT. By maintaining the PLUT with an appropriate perception threshold for each color (and/or color pairs), the image data is personalized as processed from a frame buffer using the mapped information of PLUT.

Figure 14:
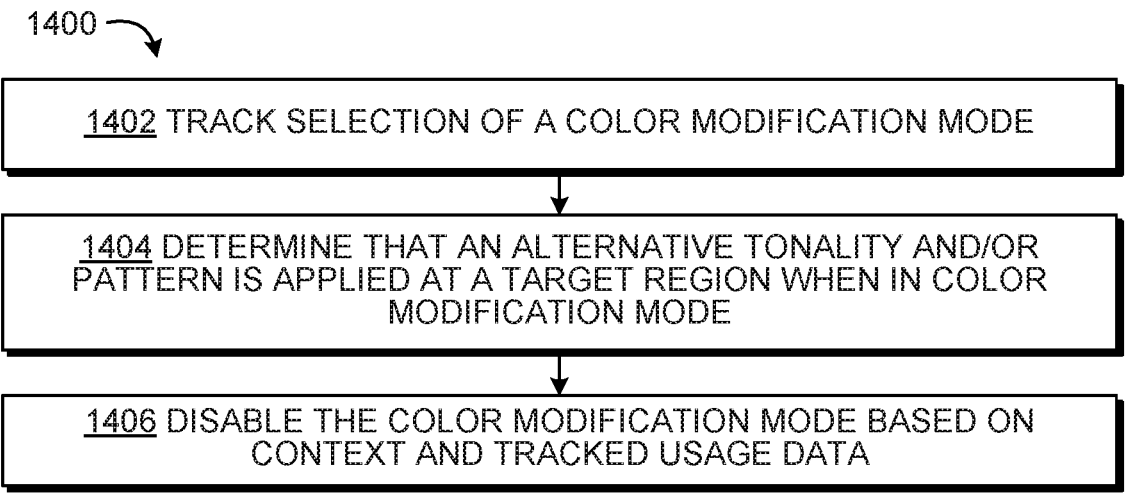

Referring to FIG. 14, an example method 1400 of operating a display device may generally include tracking a selection of color modification mode and disabling the color modification mode based on context. The method 1400 may be used, such as by an image processor, in connection with operations of the methods 1000, 1100, 1200, 1300, and other functions as described herein.

At block 1402, usage data corresponding to operation of the display in a color modification mode (e.g., a color blind assist mode) is tracked. Color modification mode, as used herein, is an operational state of a display device where alternative colors and/or patterns are used in exchange for certain colors as defined by a personalized color profile, such as the alternative colors and patterns described in other examples herein and stored in a PLUT. Disabling color modification mode, as used herein, refers to using a regular color profile (e.g., the original colors designated by the content source and displayable based on a DLUT) rather than the personalized color profile (such as a color profiled defined by a PLUT). Color modification mode may be the mode of the display device designated for performing the method 1000 of FIG. 10 or 1100 of FIG. 11, as examples. The color modification mode may be designated by a host device or designated directly on the display device. For example, the image processor may include a memory resource with a data structure (e.g., a log) for recording when the color modification mode is enabled and disabled by a user. In that example, the log may include records of color modification mode to be disabled during movies and website with videos and records of color modification mode to be enabled during games and operation of image editing applications, as examples.

At block 1404, an alternative color, alternative tonality, and/or pattern is determined to be applied at a target region when in color modification mode. Such determination may be designated as discussed in the methods and systems described herein.

At block 1406, the color modification mode is disabled based on context. For example, an application may be designated for use of the color modification mode while other applications may be designated for use without color modification mode, where such designations may be manually made by a user. For another example, based on a historical log, a color modification mode may be automatically disabled for applications or operational context where the user has previously deactivated color modification mode. Context, as used herein, may include use of an alternative color (e.g., operation in color modification mode), a function being performed by a host device, a classification of content to be presented on the display device, a time of day or other seasonality parameter, resource utilization of the display device or host device, historical records, user preferences, host device settings, and the like. Context situations in which to disable color modification mode (or enable color modification mode) may be determined based on a machine learning technique that uses the context (e.g., historical records, user preferences associated with a user profile, application information, etc.) to identify usage patterns. For example, a display device may learn how to improve a user experience, such as by enabling color modification mode for game applications and disabling color modification mode for playing videos. By designating when to use the color modification mode and restricting personalized color modifications to limit distinctions for colors that the user identifies sensitivity towards, a balance may be made between the personalized perception capabilities of a user and the desired visualization intended by a content creator, for example.

Although the flow diagrams of FIGS. 9-14 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A display system comprising:
   an image processor;
   a color coordination engine to:
      compare a color identifier entry in a device-specific color table (DLUT) that is associated with a color to be presented at a target region of a display to a color identifier entry in a personalized look-up table (PLUT),
      retrieve, from the PLUT, a perception threshold that represents a perception tolerance of the color corresponding to the color identifier entry in the PLUT and an alternative presentation identifier corresponding to the color identifier entry in the PLUT, and
      determine a modification corresponding to the alternative presentation identifier based on the perception threshold and the DLUT;
   a neighbor engine to:
      identify, for neighbor pixels in a region of the display adjacent the target region, the neighbor pixels that are within a color range corresponding to the color identifier entry in the PLUT based on the perception threshold; and
   a presenter engine to:
      cause the image processor to operate a screen to present the neighbor pixels in a modified property corresponding to the alternative presentation identifier based on the perception threshold corresponding to the color identifier entry in the PLUT.

2. The display system of claim 1, wherein:
   the presenter engine is to cause the image processor to operate the target region of the display in a pattern of a color corresponding to the alternative presentation identifier based on a tolerance range.

3. The display system of claim 1, wherein:
   the color coordination engine is to create an entry in the PLUT that associates a color input from a user with a color pattern.

4. The display system of claim 3, wherein the color coordination engine is to:
   cause a display to generate a color test using colors of the DLUT,
   identify a color input in response to the color test presented on the display, and
   determine the perception tolerance to an alternative color corresponding to a color of the DLUT based on the color input.

5. The display system of claim 3, wherein:
   the color coordination engine is to select a set of color blind presets based on the color input entered during the color test, and
   the PLUT is updated to correlate an entry matched with a color of the set of color blind presets with a corresponding alternative color and a corresponding pattern.

6. The display system of claim 1, wherein:
   the neighbor engine is to identify a plurality of groups of pixels that are within the color range based on the perception threshold, and
   the presenter engine is to cause a color pattern to be applied across the plurality of groups of pixels by interchanging individual pixels in each group among a plurality of approved colors in the PLUT.

7. A non-transitory computer-readable storage medium (NTCRSM) comprising a set of instructions executable by a processor resource to:
   identify a range of colors around a pixel region;
   compare the range of colors around the pixel region to a color within the pixel region with respect to a perception threshold that represents a perception tolerance associated with the color within the pixel region;
   determine a modification of the color within the pixel region based on the range of colors around the pixel region and the perception threshold; and
   cause a display to present the pixel region in a modified color based on the range of colors around the pixel region with respect to the perception threshold.

8. The NTCRSM of claim 7, wherein the set of instructions is executable by the processor resource to:
   adjust the color within the pixel region to change to a lighter shade within a visible range of a personalized color profile; or
   modify the pixel region to include a pattern of the color within the pixel region with a second color within the visible range of the personalized color profile.

9. The NTCRSM of claim 7, wherein the set of instructions is executable by the processor resource to:
   analyze pixel data in a frame buffer corresponding to the pixel region for any values outside of the perception threshold determined by a personalized color profile; and
   flag the pixel data to be display in an alternative color or pattern within a visible range defined by the personalized color profile.

10. The NTCRSM of claim 7, wherein the set of instructions is executable by the processor resource to:
    store a lookup table of values of color that are perceived by a user;
    compare the values to a color blind preset generated from a user preference and color blindness type;
    alter a color value of pixel data in a frame buffer in response to the comparison of the color value of the pixel data in the frame buffer to values of the color blind preset; and
    cause a screen of a display to present the altered color value in response to a drawing instruction corresponding to the pixel data of the frame buffer.

11. A method operating a display device comprising:
determining a first color value of first pixel data in a frame buffer of the display is outside a color range, the first pixel data corresponding to a first display region and the first color value corresponding to a first color;
selecting a second color value within the color range, the second color value corresponding to a second color;
identifying a third color value of second pixel data corresponding to a second display region to be presented next to the first display region, the third color value corresponding to a third color; and
in response to a determination that the third color is within a perception threshold with respect to the second color, causing a pattern to apply to the first display region to indicate the third color is different from the second color.

12. The method of claim 11, comprising:
performing a color test with a gradual change in the second color to identify when the second color becomes perceptively similar to the third color;
identify a color sensitivity corresponding to the second color based on the color test; and
store the perception threshold in a personalized look-up table corresponding the second color based on the identified color sensitivity.

13. The method of claim 12, comprising:
using the perception threshold to determine a pattern type and a pattern differentiation color;
causing the display to present the pattern differentiation color and the second color in the pattern type at the second display region.

14. The method of claim 11, comprising:
tracking usage data corresponding to operation of the display in color modification mode; and
disabling color modification mode based on context and the tracked usage data.

15. The method of claim 14, wherein the color modification mode is determined to be enabled or disabled based on machine learning corresponding to the context, the context including application information associated with a host device and user preferences associated with a user profile.

* * * * *